Patented Apr. 4, 1950

2,503,175

UNITED STATES PATENT OFFICE 2,503,175

METHOD OF REFINING TRINIDAD ASPHALT

Preston R. Smith, Rutherford, N. J., assignor, by mesne assignments, to Barber Oil Corporation, a corporation of Delaware No Drawing. Application June 28, 1946,
Serial No. 680,088

5 Claims. (Cl. 196—14)

This invention relates to a method for refining bitumen mixed with mineral matter and, more particularly, contemplates procedure for the removal of water and naturally contained mineral matter from Trinidad lake asphalt.

Various bitumens naturally mixed with mineral matter, such as Sisquoc asphalt, Trinidad lake asphalt, Trinidad land asphalt, and the like, are known and the economic separation of the mineral matter from the bitumen has heretofore presented a problem which has not been satisfactorily solved.

Crude Trinidad lake asphalt, as is well known, comprises broadly bitumen or asphalt with which is mineral matter comprising clay, much of which is in colloidal size particles, silica sand of various particle size and water usually in the form of a saline solution.

While the presence of clay in Trinidad lake asphalt is believed to impart to the asphalt desirable properties and is therefore advantageous, the presence of sand, especially of the larger particle sizes, and of water as normally contained in such asphalt, has long been recognized as disadvantageous in the handling of it in certain types of apparatus.

Heretofore in the preparation or refining of crude Trinidad asphalt for commercial uses, it has been customary to subject it to a heat treatment at a temperature sufficiently high to liquefy it to effect vaporization of the water content and the removal of small quantities of vegetable matter by flotation or screening. However, by such treatment the total quantity of mineral matter present has been substantially unaffected.

Now in accordance with this invention, it has been found that if crude Trinidad lake asphalt containing water be admixed with a solvent for bitumen, for reduction of the fluidity of the asphalt, the disadvantageous portion of the mineral matter can be separated from the bitumen content substantially completely or to a desired extent. The separation may, for example, be effected by gravity separation, by which term I mean to include settlement, and also centrifugation.

Again, it has been found that water in excess of that normally contained by the asphalt under treatment may be present in the mixture subjected to separation. Excess water, if present, will desirably carry a salt, or other suitable substance, in solution to minimize the emulsifying effect of the colloidal clay content of the asphalt, especially where the mixture is agitated.

Alternative to the treatment of crude Trinidad lake asphalt, it is contemplated that the mehod according to this invention may be effectively applied to the treatment of Trinidad lake asphalt from which has been removed at least a portion of its naturally contained water, for example, by heat treatment as described above, but it is preferred that water be present in the mixture of solvent and asphalt subjected to separation.

From the more specific standpoint and as exemplifying, in detail, procedure according to this invention as applied to the refining of crude Trinidad lake asphalt, the following general description and specific example will be illustrative but not limiting upon the appended claims.

In proceeding, crude Trinidad asphalt, which has not been subjected to processing for the removal of its normal content of water, is first reduced, as by grinding, to a convenient particle size, and then admixed with a solvent for bitumen to reduce the viscosity of the crude asphalt by the formation of a solution of bitumen in which mineral matter carrying water will be suspended.

The purpose of reducing the crude asphalt to convenient particle size, as, by grinding, is to facilitate solution of the bitumen when mixed with a solvent, hence the particle size to which the crude product is reduced is not of any primary importance. However, by way of example, the crude product may be reduced in particle size to pass a quarter inch sieve. The reduction in particle size may be accomplished in any convenient manner and with the use of any convenient apparatus. By way of example the crude product may be ground in a hammer mill.

The solvent with which the crude Trinidad asphalt is mixed may be any well known solvent for bitumen having a specific gravity such that the specific gravity of the resultant bitumen solution will be substantially different from that of the aqueous component of the mixture, i. e., water or salt solution. This aqueous component may be the water naturally contained in the crude Trinidad asphalt which water is usually saline, or it may be added water, which may, if desired, contain a salt in solution. The solvent will preferably have a specific gravity such that the specific gravity of the solution of bitumen therein will be less than that of the aqueous component of the mixture and desirably the difference between the specific gravity of the solution and that of the aqueous component of the mixture will be as great as possible with consideration for practical and economic considerations.

Where it is intended that the solvent be recovered from the bitumen after separation of mineral matter, as will generally be the case, it is desirable to select a solvent the high boiling ends of which will boil lower than the low boiling ends of the dissolved bitumen, thus avoiding substantial changes in the properties of the bitumen or the recovered solvent. However, where it is desired to modify these properties, a solvent may be selected, the boiling range of which overlaps that of the bitumen.

As allustrative, but not by way of limitation, the solvent may be a petroleum derivative such, for example, as mineral spirits, a heating oil, or the like; a coal tar distillate such, for example, as benzol, solvent naphtha, or the like; a wood distillation product, such, for example, as refined turpentine, dipentene, or the like; chlorination products, as, for example, a monochlor pentane, carbon tetrachloride, and the like, and other suitable solvents such as carbon disulfide. In certain cases, mixtures of such solvents may be used.

The proportion of solvent to crude Trinidad lake asphalt is not critical. Generally speaking, however, the solvent will be in amount such as to produce a solution of the bitumen having the greatest economically practical fluidity, having consideration for the properties of the solvent and the economics of solvent recovery. Usually, by way of illustration, solvent in amount from about 50% to about 200%, by weight of the Trinidad asphalt, will produce a suitably fluid mixture.

The mixing of the crude Trinidad asphalt with the solvent may be accomplished in any convenient manner with use of any convenient form of apparatus. By way of example, the mixing may be accomplished by addition of the crude asphalt to a body of solvent in a tank equipped with agitating means. The mixing will be continued until the bitumen of the crude product is substantially dissolved in the solvent and the mineral matter carrying water is dispersed or suspended in the solution. It will be understood that the time of mixing will not be critical in that, if desire or economy dictates, more or less of the actual bitumen content of the crude asphalt, such as may resist the dissolving action of the solvent, may be left undissolved.

In the mixing of the crude asphalt with a solvent, heat may be applied to facilitate the solution of the bitumen. Where heat sufficient under atmospheric pressure to volatilize the solvent, or any low boiling ends thereof, or to volatilize the water content of the crude asphalt, is applied, a closed mixing apparatus will be used and a pressure, to negative volatilization of solvent, or water, at the temperature used, will be allowed to build up, or will be otherwise set up, in the apparatus; and in such case the subsequent separation of mineral matter will be effected in a closed system, as will appear from the further description herein of procedure according to this invention.

The mixture of crude Trinidad asphalt and solvent may contain water, or a saline solution, in addition to that (saline solution) present in the crude product as admixed with the solvent. The presence of additional water in the mixture, and which, it is believed, will increase the proportion of mineral matter wetted by or carrying water, may be accomplished by the addition of water to the crude product before mixing with the solvent, as, for example, during the grinding operation, or to the ground product, or the water may be added with agitation when the ground product and the solvent are brought together, or thereafter.

While plain water may be used for obtaining in the mixture an excess over that contained by the crude asphalt, it will be desirable that the added water contain a salt in solution, which will act to minimize the emulsifying effect of the colloidal clay of the crude asphalt. The presence of a salt in solution in the added water will have the further advantage that it will increase the specific gravity of the aqueous phase over that of water alone and, if possible, a salt may be chosen to produce a solution such as will facilitate wetting of the mineral matter in the mixture.

Any well known salt which will perform one or another of the functions indicated may be used. However, by way of example, sodium chloride, calcium chloride, sodium sulfate, and the like, may be used effectively. As exemplifying a suitable solution, for example, sea water will be effective.

If excess water be added, the exact amount of water, or saline solution, added will not be critical. It will be desirable to add sufficient water to effect wetting of mineral matter of the crude asphalt. Any very substantial excess of water will be avoided and usually water in amount of preferably about 10%, or say within the range of about 2.0% to about 20.0% by weight of the crude asphalt will be sufficient.

When the crude asphalt and solvent have been sufficiently mixed, the resultant fluid solution of bitumen with mineral matter suspended therein and carrying water will desirably be run through a screen to remove extraneous matter, as pieces of wood, and will then be treated for the separation of mineral matter from bitumen solution.

The separation may be effected by permitting the mixture to stand undisturbed in a suitable vessel, which may be the vessel in which the mixture was formed and which will be closed if the temperature of the mixture is at or above the vaporization point of water or any material portion of the solvent, for a sufficient period to permit settlement of the mineral matter carrying water, or such amount thereof as is desired, decanting the bitumen solution and separating the solvent from the solution for recovery of the refined asphalt. Obviously, the solvent may be separated from the solution by distillation and it may be recovered by condensation.

When so proceeding, it may be desirable to treat the sludge, by which I mean the residue or material settled out, obtained for recovery of bitumen and/or solvent therefrom.

As a preferable treatment for the mixture, it will be subjected to centrifugation, with treatment of the effluent for separation of solvent and refined asphalt and recovery of the solvent; and, if the amount of solvent, or bitumen, carried by the sludge make it economic, treatment of the sludge for the recovery of solvent, and/or bitumen, therefrom. Here again, if the temperature of the mixture is at or above that at which water, or any material portion of the solvent, will vaporize, the separation may be effected in a closed system.

Centrifugation of the mixture may be effected in any suitable form of centrifuge. Thus, by way of example, a centrifuge of the solid bowl type will be effective, and, if used, will preferably be equipped with, for example, a plow, or other means, to effect continuous removal of the sludge in order to permit continuous operation. Desirably, however, for high efficiency a centrifugal device will be used such as a centrifugal filter, comprising a truncated cone shaped bowl within which is a screw conveyor for the removal of the sludge, arranged to rotate in the same direction at but a slightly higher speed than the bowl. Such device will be highly efficient for use in effecting the separation step due to the fact that it will effectively handle the mixture within a wide range of fluidity, temperature and mineral matter content, and is capable of continuous and rapid separation and close classification of mineral matter of the finer particle sizes.

When the separation of the mixture is effected by centrifugation, the mixture may be run directly from the vessel in which it is formed to the centrifuge. The effluent or filtrate will then be run to such apparatus, distillation and condensation, as is used for removal of the solvent from the refined asphalt and recovery of the solvent; and the sludge may be discharged to any convenient point for its disposal or recovery of solvent therefrom, or such treatment, as reprocessing for the recovery of bitumen therefrom, as may be economically worth while.

As will be obvious, the procedure may be carried on continuously by forming the mixture in, and running it from, alternate vessels, or by using dissolving apparatus of the continuous type, preferably with counter-current flow of asphalt and solvent, such apparatus being well known in the art. And, as has been made clear, if the temperature at which the mixture is formed dictates, the procedure will be carried out in a closed system under pressure sufficient to prevent volatilization of water or any material portion of the solvent. Following the separation of mineral matter, the pressure may be released from the solution in suitable apparatus to permit volatilization of solvent from the solution of refined asphalt.

As specifically illustrative of an application of the method according to this invention to the refining of crude Trinidad lake asphalt, for example, a quantity of crude Trinidad lake asphalt, reduced in a hammer mill, to a particle size not in excess of about one-quarter of an inch, is agitated, in a closed vessel, with an equal amount by weight of mineral spirits at a temperature of 140°–180° F. until the bitumen content of the crude asphalt is substantially dissolved in the solvent with the mineral matter of the crude asphalt dispersed in the solution. The mixture thus produced is run through a screen, to remove extraneous matter as wood, into a solid bowl centrifuge.

The effluent from the centrifuge will be heated to evaporate the solvent for recovery of the refined asphalt, the solvent being recovered by condensation. The sludge, containing mineral matter, water and some bitumen, may be reprocessed by mixing with mineral spirits and centrifuging for recovery of further refined asphalt, or the sludge may be treated for the recovery of solvent and discarded or used for any purpose for which it may be adaptable.

In proceeding as above, water or a saline solution in amount of about 2%–20% by weight of the crude asphalt, as, for example, sea water in amount of about 10% by weight of the crude asphalt, may be added to the crude asphalt before mixing with the solvent or to the mixture before it is run to the centrifuge.

The method in accordance with this invention as illustratively described above may be applied to the refining of Trinidad lake asphalt which has been partialy refined by sulbjecting it as heretofore mentioned to heating for the removal of contained water, where water or a saline solution is added to the partially refined asphalt, or to the mixture thereof with a solvent, before the mixture is treated for the separation of mineral matter from the solution of bitumen.

It will be appreciated that effectiveness of the method according to this invention springs from the broadly novel concept, not heretofore perceived, that a substantial part of the objectionable portion of the mineral matter contained in crude Trinidad lake asphalt, together with at least a part of the water normally contained by such crude asphalt, could be gravitationally separated from the bitumen or asphalt content on reduction of the viscosity of the crude asphalt through the formation of a mixture comprising a solution of the bitumen in a solvent.

It will further be appreciated that secondarily the effectiveness of the method according to this invention springs from the novel concept that the addition of water or saline solution to the crude asphalt, or to Trinidad lake asphalt which has been partially refined by heating to drive off the water content, before mixing with a solvent, or after the bitumen content is dissolved, would promote the separation.

The refined product produced according to the method of this invention is possessed of numerous novel characteristics which distinguish it from Trinidad lake asphalt as heretofore partially refined or modified by processing and which render it adaptable for various uses in the commercial arts for which such asphalt was variously unsuited, and permit its being handled by various apparatus such as pumps, spray nozzles, and the like, without the abrasive and clogging effects of modified or partially refined Trinidad lake asphalt as heretofore known.

More specifically, the refined product of the method of this invention will comprise an asphalt having essentially the characteristics of the bitumen content of crude Trinidad lake asphalt containing substantially only the more desirable portions of its mineral matter. The product will be substantially free from water and will contain substantially the clay content of the crude asphalt in suspension. The product will be substantially free from silica and substantially free from any practically consequential amount of mineral matter of a particle size larger than about 10 microns and will contain mineral matter including the clay of the crude asphalt in amount not in excess of about 30% by weight of the refined asphalt in distinction from the crude asphalt, and from partially refined products heretofore known, in which the particle size of about one-half of the mineral matter by weight exceeds 10 microns and in which a substantial proportion exceeds 40 microns and was, so far as the art heretofore perceived, in the main inseparable from the bitumen.

To the end that products in accordance with this invention may be identified, by way of example, the particle size of the mineral matter is determined by a modification of the Bouyoucos hydrometer method which provides a method whereby the specific gravity of a suspension may be determined at predetermined intervals by means of a special hydrometer, the change in specific gravity with the time being a function of the weight of mineral matter remaining in suspension.

The method is described generally under A. S. T. M. designation D 422–39 and is described in detail below with particular reference to those modifications necessary to adapt it to the measurement of the particle size of the mineral matter in Trinidad asphalt.

The Bouyoucos hydrometer method is based on

Stokes' Law, which for present purposes may be stated algebraically as follows:

$$d = \sqrt{\frac{36 \times 10^8 hn}{120(D_s - D_f)gt}} \quad (1)$$

where $d$=diameter of the particle in microns
$h$=distance in centimeters through which particle has fallen
$n$=viscosity of the suspending fluid (poises)
$D_s$=specific gravity of the solid
$D_f$=specific gravity of the fluid
$g$=acceleration due to gravity (cm./sec./sec.)
$t$=time interval in minutes From the above equation it is evident that the physical characteristics required to be determined preparatory to the actual determination of particle size are (1) the specific gravity of the mineral matter in a dry, bitumen-free condition; (2) the specific gravity of the bitumen solution which constitutes the suspending medium; and (3) the viscosity of the bitumen solution.

The average specific gravity of the mineral matter may be directly determined and has been found to be 2.14.

The specific gravity and viscosity of the suspending medium, namely, a solution of bitumen, cannot be determined directly since the bitumen cannot be obtained free from its extremely fine mineral matter either by itself or in solution, hence, it is necessary to determine these characteristics indirectly. This was done by dissolving the bitumen over a sample of Trinidad refined asphalt (T. R. A.) while retaining the mineral matter in dispersion therein, the solvent being a standardized high solvency petroleum solvent of 270–350° F. boiling range. The suspension so obtained was centrifuged to varying degrees to produce a series of suspensions having three different ratios of ash to asphalt and each of these suspensions was further diluted to varying degrees with the solvent to produce four different bitumen concentrations. The viscosities and specific gravities of the twelve resulting suspensions were then determined. These values, expressed in specific gravity at 25° C. are given in the body of the following table opposite the corresponding values for grams of bitumen per 100 milliliters of suspension and percentages of ash in the suspension.

| Grams of Bitumen per 100 ml. of T. R. A.—Suspension | Percentage Ash | | |
|---|---|---|---|
| | 3.67% | 7.20% | 12.8% |
| 0.98 | 0.8510 | 0.8513 | 0.8518 |
| 2.94 | 0.8543 | 0.8548 | 0.8554 |
| 4.90 | 0.8596 | 0.8599 | 0.8605 |
| 7.84 | 0.8703 | 0.8706 | 0.8711 |

The above values were then plotted and the curves extrapolated to zero ash content which gave the following values:

| | Grams of bitumen per 100 ml. of suspension | | | |
|---|---|---|---|---|
| | 0.98 | 2.94 | 4.90 | 7.84 |
| Specific Gravity | 0.8506 | 0.8539 | 0.8592 | 0.8699 |

The viscosities of the same series of 12 samples were determined and are shown in the body of the table below, expressed in terms of poises at 25° C.

| Grams of Bitumen per 100 ml. of T. R. A.—suspension | Percentage Ash | | |
|---|---|---|---|
| | 3.67% | 7.20% | 12.8% |
| 0.98 | 0.00791 | 0.00796 | 0.00807 |
| 2.94 | 0.00842 | 0.00846 | 0.00853 |
| 4.90 | 0.00910 | 0.00916 | 0.00924 |
| 7.84 | 0.01104 | 0.01110 | 0.01118 |

These values were also plotted and the curves extrapolated to zero ash content which gave the following values:

| | Grams of bitumen per 100 ml. of suspension | | | |
|---|---|---|---|---|
| | 0.98 | 2.94 | 4.90 | 7.80 |
| Viscosity | 0.00782 | 0.00835 | 0.00903 | 0.01095 |

In order to determine the quantity $h$ in Equation 1 it is necessary to calibrate the special precision hydrometer in conjunction with the graduated cylinder with which it is used. The mathematical expression for the quantity $h$ and the values for the particular apparatus used are as follows:

*Hydrometer calibration*

Hydrometer No. 92, Eimer & Amend, Catalog No. (14-331-5)
Range, 0.850–0.900

$$h = H_1 + \tfrac{1}{2}(H - V/A)$$

$h$=effective height through which a particle has fallen
$H_1$=distance in cms. from bottom of paper scale to any hydrometer reading.
Diameter of graduate (internal) =5.82 cm.
$A$=area of graduate jar=26.6 sq. cm.
$V$=volume of bulb=42.3 cc.
$H$=distance in cms. from bottom of hydrometer bulb to bottom of paper scale=13.14 cm.
$K = \tfrac{1}{2}(H - V/A) = \tfrac{1}{2}(13.14 - 42.3/26.6) = 5.78$ $$h = H_1 + 5.78$$

| Hydrometer Reading | $H_1$ in cm. | $h$ in cm. | Hydrometer Reading | $H_1$ in cm. | $h$ in cm. | Hydrometer Reading | $H_1$ in cm. | $h$ in cm. |
|---|---|---|---|---|---|---|---|---|
| 0.8850 | 4.62 | 10.40 | 0.8730 | 7.30 | 13.08 | 0.8610 | 10.06 | 15.84 |
| 0.8840 | 4.84 | 10.62 | 0.8720 | 7.53 | 13.31 | 0.8600 | 10.30 | 16.08 |
| 0.8830 | 5.08 | 10.89 | 0.8710 | 7.76 | 13.54 | 0.8590 | 10.54 | 16.32 |
| 0.8820 | 5.31 | 11.09 | 0.8700 | 7.97 | 13.75 | 0.8580 | 10.77 | 16.55 |
| 0.8810 | 5.52 | 11.30 | 0.8690 | 8.20 | 13.98 | 0.8570 | 11.00 | 16.78 |
| 0.8800 | 5.74 | 11.52 | 0.8680 | 8.44 | 14.22 | 0.8560 | 11.24 | 17.02 |
| 0.8790 | 5.96 | 11.74 | 0.8670 | 8.67 | 14.45 | 0.8550 | 11.47 | 17.25 |
| 0.8780 | 6.19 | 11.97 | 0.8660 | 8.90 | 14.68 | 0.8540 | 11.70 | 17.48 |
| 0.8770 | 6.41 | 12.19 | 0.8650 | 9.14 | 14.92 | 0.8530 | 11.91 | 17.69 |
| 0.8760 | 6.64 | 12.42 | 0.8640 | 9.38 | 15.16 | 0.8520 | 12.14 | 17.92 |
| 0.8750 | 6.85 | 12.63 | 0.8630 | 9.61 | 15.39 | 0.8510 | 12.38 | 18.16 |
| 0.8740 | 7.08 | 12.86 | 0.8620 | 9.84 | 15.62 | 0.8500 | 12.61 | 18.39 |

In advance of determination of the actual specific gravity of the suspension it is impossible to determine the time intervals corresponding to definite particle sizes, but a rough approximation may be made by assuming limiting values for specific gravity. Values for $d$ can therefore be taken from which can be calculated values of $t$ close to the values desired. For the particular conditions described, this indicated that readings should be taken at the time intervals given in the following table:

| Approx. particle diameter in microns | Settling Time in Minutes |
|---|---|
| 40 | 1.8 |
| 30 | 3 |
| 20 | 7 |
| 15 | 13 |
| 10 | 32 |
| 8 | 45 |
| 5 | 120 |
| 4 | 185 |
| 3 | 325 |
| 2 | 725 |
| 1 | 3,100 |

The procedure of the actual test is as follows: A sample of the refined Trinidad asphalt of such a size that it contains approximately 20 grams of mineral matter is dissolved in the solvent indicated in a 1000 ml. tall type Griffin beaker and the volume made up to approximately 500 ml. with more of the solvent. The resulting suspension is vigorously agitated with a high speed mechanical stirrer to thoroughly disperse the particles of mineral matter and the contents of the beaker then transferred to the graduated cylinder, care being taken to include all of the mineral matter. The graduated cylinder should be filled to slightly below the 1000 ml. mark with the solvent and brought to constant temperature in a bath maintained at 25° C. After the suspension has reached the bath temperature the liquid level in the cylinder is brought exactly to the 1000 ml. mark by the further addition of the solvent. The cylinder is then stoppered, removed from the bath and agitated vigorously for approximately one minute in order that the mineral matter may again be completely dispersed. The cylinder is then returned to the bath and the time noted. While standing, the cylinder should be covered with a watch glass to prevent evaporation. Hydrometer readings are then taken at various time intervals as mentioned above, depending upon the size limits of the particles to be determined. The technique of making the hydrometer readings has been carefully determined experimentally and requires that the hydrometer be inserted at such a rate that approximately 7 seconds are required to complete the insertion, and after reading it should be removed at the same rate, since this does not cause undue agitation of the sample. In no case should the hydrometer remain in the suspension for a continuous period of more than 5 minutes. It will be seen that by careful timing the first two readings may be taken with one insertion. Because of the opacity of the suspension the top of the meniscus should be used to read the hydrometer and the reading must be made to the 4th decimal place. The two latter rules must be observed in calibration as well as in the actual determination.

The hydrometer is held ready for use by suspending it in a cylinder of the solvent. Before re-immersion in the suspension it must be allowed to drain briefly. The solvent in which the hydrometer is kept between readings should be changed whenever it becomes cloudy and, if, due to contamination, a meniscus does not form properly against the stem of the hydrometer it should be washed with soap and water or with alcohol.

Since the hydrometer has been previously calibrated in terms of the value $h$, to determine $d$, it is merely necessary to substitute the values obtained for $h$, $n$, $D_s$, $D_f$ and $t$ in the algebraic expression of Stokes' Law given above. From the data already determined it is then possible to determine quantitatively the cumulative weight per cent. of the mineral matter which is finer than any given particle diameter by means of the following equation:

$$X = \frac{D_s \times 10^5 \times (D_t - D_f)}{(D_s - D_f) W}$$

in which $X$ = per cent. by weight of the total mineral matter which is finer than a given particle diameter
$D_t$ = the specific gravity of the suspension at any time $t$
$W$ = the weight in grams of mineral matter originally contained in the suspension, and the other values have the same significance as in the previous discussion.

Since the chosen values for $t$ were originally determined only approximately, it is necessary to interpolate between the data so obtained in order to arrive at the precise particle size fractions desired. This may be accomplished most conveniently by plotting in a manner well known in the art.

A typical set of cumulative gradings determined as above for a product in accordance with my invention is as follows:

| Maximum Particle Size in Microns | Per cent. by weight based on total mineral matter |
|---|---|
| 15 | 100.0 |
| 10 | 99.3 |
| 8 | 94.1 |
| 5 | 76.0 |
| 4 | 64.7 |
| 3 | 54.2 |
| 2 | 40.9 |
| 1 | 18.7 |

It will be understood that where in the claims appended hereto the term "Trinidad lake asphalt" is used, such term is intended to include crude Trinidad lake asphalt and Trinidad lake asphalt which has had water removed, as by heating.

Due to the association of certain other materials with the clay and silica, the term "mineral matter" as used in this application will, for convenience, be understood to include that portion, other than free water, of the crude Trinidad asphalt which is insolube in carbon disulfide.

As will be appreciated, the procedure according to this invention as described above will be applicable to various bituminous or asphalt mixtures with mineral matter for the separation of the bitumen from the mineral matter.

What I claim and desire to protect by Letters Patent is:

1. A refined Trinidad lake asphalt containing in suspension a portion of the mineral matter naturally contained in crude Trinidad lake asphalt, the mineral matter being in amount not in excess of about 30% by weight of the refined asphalt and of a particle size not larger than about 10 microns and including substantially all of the clay content naturally contained in crude Trinidad lake asphalt.

2. A method for refining Trinidad asphalt mixed with mineral matter including the clay naturally contained in crude Trinidad asphalt, which includes the steps of forming a mixture of a solution of said asphalt in a solvent with water, the amount of solvent in the mixture being in excess of the amount of water and the solvent phase of said mixture having a specific gravity different from that of the aqueous component of the mixture, and effecting a gravity separation of mineral matter of a size above about 10 microns and water from solvent and asphalt dissolved therein without substantially reducing the clay content of the asphalt.

3. A method for refining Trinidad asphalt mixed with mineral matter including the clay naturally contained in crude Trinidad asphalt, which includes the steps of forming a mixture of said asphalt in a solvent in amount of 50%–200% by weight of the asphalt with water in amount of 2%–20% by weight of the asphalt, the solvent phase of said mixture having a specific gravity different from that of the aqueous component of the mixture, and effecting a gravity separation of mineral matter of a size above about 10 microns and water from solvent and asphalt dissolved therein without substantially reducing the clay content of the asphalt.

4. A method for refining Trinidad asphalt containing clay and water, which includes the steps of forming a solution of said asphalt in a solvent therefor containing in admixture therewith the water naturally contained by the asphalt, the amount of solvent in the mixture being in excess of the amount of water and the asphalt-solvent phase of said mixture having a specific gravity different from that of the aqueous component of the mixture, and effecting a gravity separation of mineral matter of a size above about 10 microns and water from solvent and asphalt dissolved therein without substantially reducing the clay content of the asphalt.

5. The method of refining Trinidad asphalt according to claim 2, characterized by the fact that the water mixed with the solution of asphalt in a solvent contains sodium chloride in solution.

PRESTON R. SMITH.

REFERENCES CITED

The following references are of record in the file of this patent:

UNITED STATES PATENTS

| Number | Name | Date |
| --- | --- | --- |
| 162,394 | Lee | Apr. 20, 1875 |
| 528,841 | Adams | Nov. 6, 1894 |
| 1,520,752 | Horwitz | Dec. 30, 1924 |
| 1,607,977 | Armstrong | Nov. 23, 1926 |
| 1,615,121 | Fyleman | Jan. 18, 1927 |
| 1,672,231 | Ryan | June 5, 1928 |

OTHER REFERENCES

Abraham, "Asphalts and Allied Substances," 4th ed., page 187, published by Van Nostrand C., New York, 1938.